United States Patent [19]
Roberts

[11] 3,966,146
[45] June 29, 1976

[54] AIR BLADDER SEAT CUSHION FOR HIGH ACCELERATION COCKPIT

[75] Inventor: Edward O. Roberts, Xenia, Ohio

[73] Assignee: The United States of America as represented by the Secretary of the Air Force, Washington, D.C.

[22] Filed: Mar. 10, 1975

[21] Appl. No.: 556,987

[52] U.S. Cl. ............................ 244/122 A; 297/284
[51] Int. Cl.² ................................ B64D 25/04
[58] Field of Search ............... 244/122 R, 122 A; 297/284, 456, DIG. 3; 5/348 R

[56] References Cited
UNITED STATES PATENTS

| 2,702,677 | 2/1955 | Replogle | 244/122 A |
| 3,330,598 | 7/1967 | Whiteside | 297/456 X |
| 3,826,434 | 7/1974 | Von Beckh | 244/122 R |

Primary Examiner—Duane A. Reger
Assistant Examiner—Barry L. Kelmachter
Attorney, Agent, or Firm—Joseph E. Rusz; Arthur R. Parker

[57] ABSTRACT

A high acceleration cockpit-ejection seat having an air bladder-liner element acting as a cushion/pad and inflatable to effectively provide a significant backward tilt to, and thus greatly increase the pilot's tolerance to the high g-loads associated with fighter aircraft maneuvering at high speeds.

3 Claims, 3 Drawing Figures

AIR BLADDER SEAT CUSHION FOR HIGH ACCELERATION COCKPIT

RIGHTS OF THE GOVERNMENT

The invention described herein may be manufactured and used by or for the Government of the United States for all governmental purposes without the payment of any royalty.

BACKGROUND OF THE INVENTION

This invention relates generally to aircraft ejection seats and, in particular, to the use of an inflatable seat cushion acting as an insert or liner element for the ejection seat and inflatable to place the pilot or other occupant in a backward tilt configuration for increased protection against high g forces occurring particularly during the high speed maneuvering of fighter aircraft.

The problem of protecting the pilot and crew from the high g forces associated particularly with high speed aircraft flight has been under consideration for many years. One solution has been to equip the pilot and aircrew with an anti-g suit which is currently worn in conventional fighter aircraft. A second solution is to actually increase the angle of the aircraft seat to the rear in order to overcome the usual effects of high g loads. One line of development involved the rotation to the rear of the entire seat. However, this proved to be unsatisfactory since this technique resulted in the dropping of the pilot's or other aircrew member's head and therefore line of vision to a disadvantageously low position in the cockpit making good visibility impossible particularly in the forward direction.

A second attempted solution to the foregoing problem was concerned with the use of a mechanical linkage means as an insert or liner to the main seat, the purpose of which being to move the actual seat portion being occupied in an upward and forward direction while, simultaneously, tilting the back portion of the seat to the rear. This technique suffers from the quite significant disadvantage of requiring a whole new seat involving a research and development program estimated to cost from between 6 to 7 million dollars. The obvious unsatisfactory nature of the foregoing attempted solution to the problem of providing protection against the high g forces of high speed aircraft flight maneuvering led to the new, novel and yet greatly simplified technique proposed by the present invention which technique offers a greatly improved system as will appear self-evident in the following summary and detailed disclosure thereof.

SUMMARY OF THE INVENTION

The present invention consists in a unique combination of a conventional aircraft-ejection seat applicable in a High Acceleration Cockpit (HAC) with a new and improved means for significantly increasing the tolerance of the pilot or other aircrew member to sustained acceleration levels of 10 to 12 g's. Said tolerance improving means consists of an inflatable air bladder cushion having integral back and bottom portions collectively acting as an insert or liner element and respectively disposed in suitably attached relation against the ejection seat back and pan portions. In the conventional aircraft ejection seat, the seat back thereof is disposed at a fixed predetermined minimum angle of backward tilt of 17°, for example, although this angle may vary in particular aircraft from 13° to 20° and, in one aircraft; namely, the F-16, it is 30°. With this arrangement, when the inventive air bladder cushion is in its uninflated condition, the pilot occupying the ejection seat will be disposed with his back at the said predetermined minimum backward tilt angle. This would be the upright position and would be the situation occuring during normal flight conditions.

By increasing the seat back angle to a specified and predetermined maximum angle of backward tilt to 65°, for example, the human tolerance level for sustained g loads can be increased significantly. For this important purpose, the novel air bladder cushion of the present invention is inflated to form a couch or cushion to effectively increase the back angle of the pilot to the aforementioned 65° during high speed flight maneuvering conditions.

Other objects and advantages of the invention will become readily apparent hereinafter in connection with the following disclosure, taken with the accompanying drawings, in which:

DESCRIPTION OF THE PREFERRED EMBODIMENT

Figure 1:
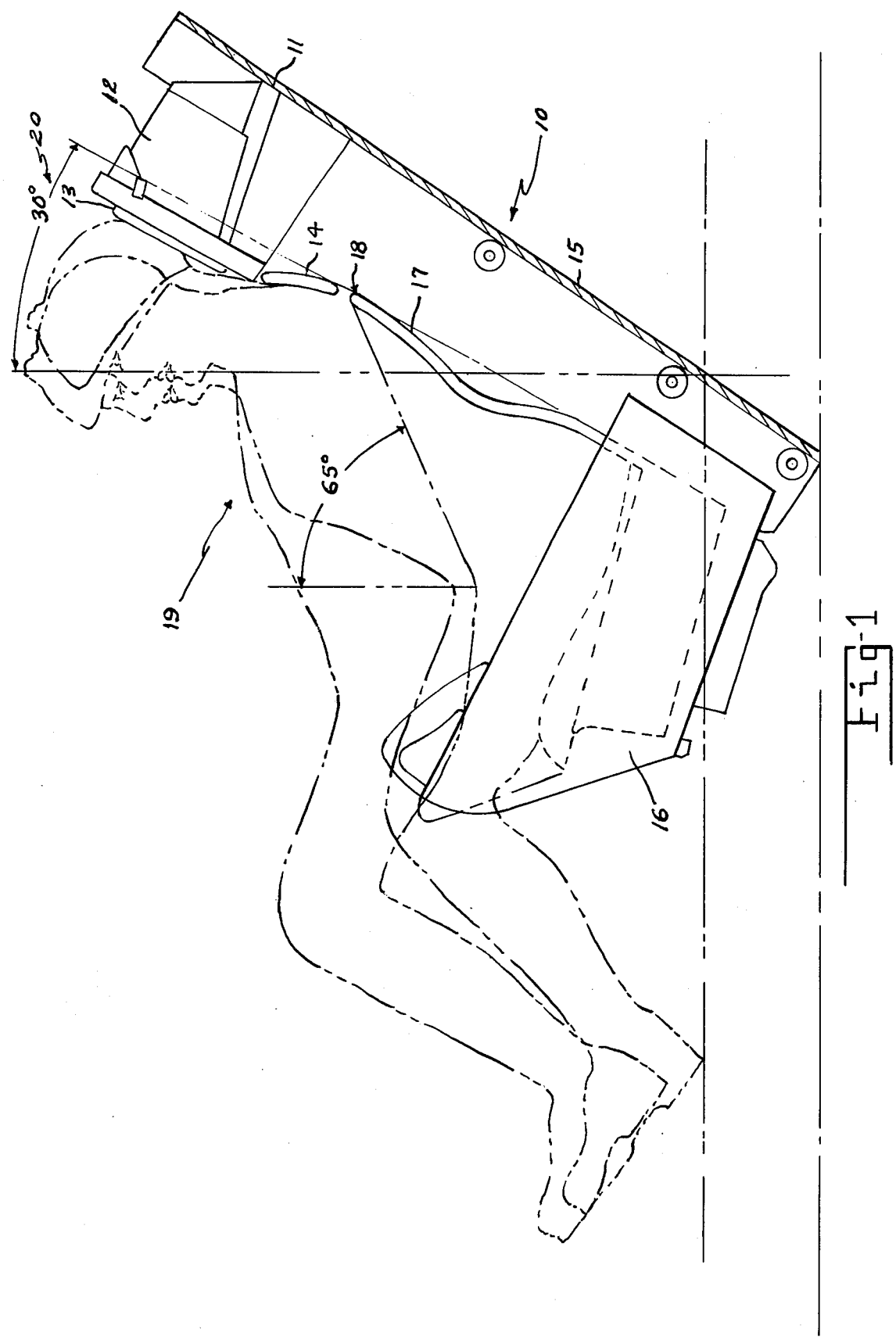
FIG. 1 is an overall schematic and side elevational view, illustrating a pilot seated in a conventional aircraft ejection seat with the inventive air cushion bladder-insert element shown in both deflated and inflated conditions.

Referring specifically to FIG. 1 of the drawings, the new and improved combined air bladder cushion and aircraft ejection seat of the present invention is indicated generally at 10 as consisting principally of a conventional type of high speed fighter aircraft ejection seat 11 having a head rest portion 12 with a front heat rest-pad 13, an additional pad 14 for the upper back of the seat occupant, a seat back portion 15, a seat pan portion 16, and, in unique combination therewith, the novel inflatable air bladder cushion of the present invention, indicated generally at 17 as constituting an insert or liner for the ejection seat 11. The air bladder cushion 17 may, of course, be suitably attached to the aircraft ejection seat 11 such as at the area indicated generally at the reference numeral 18, as well as elsewhere, to ensure that it is retained in a stationary position during its use by a pilot or other aircrew member, indicated generally at 19. The deflated or, in other words, stowed condition or position of the invention air bladder cushion 17 is indicated in solid lines whereas the inflated condition or position thereof is indicated in phantom.

Figure 2:
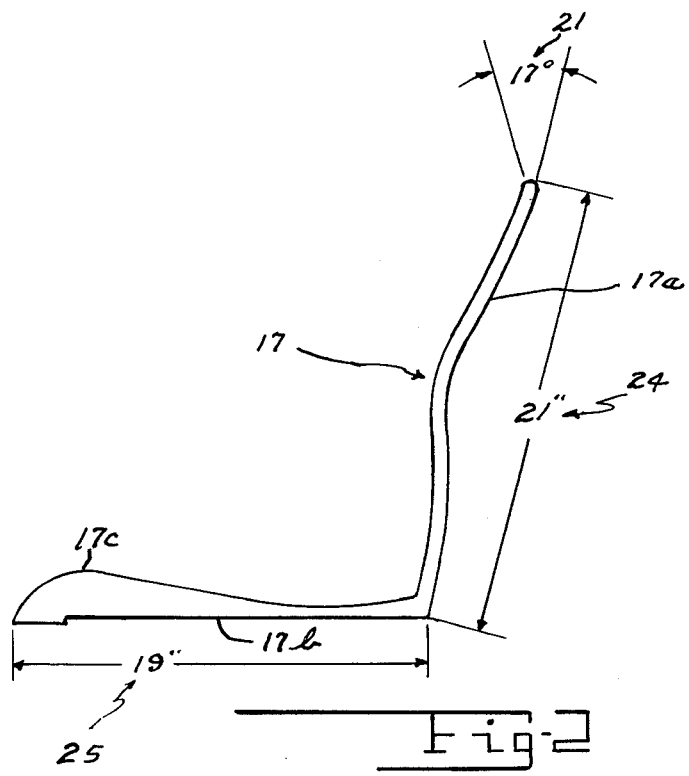
FIGS. 2 and 3 more clearly illustrate details of the separate air cushion bladder of the present invention, shown respectively in the deflated and inflated positions.
Figure 3:
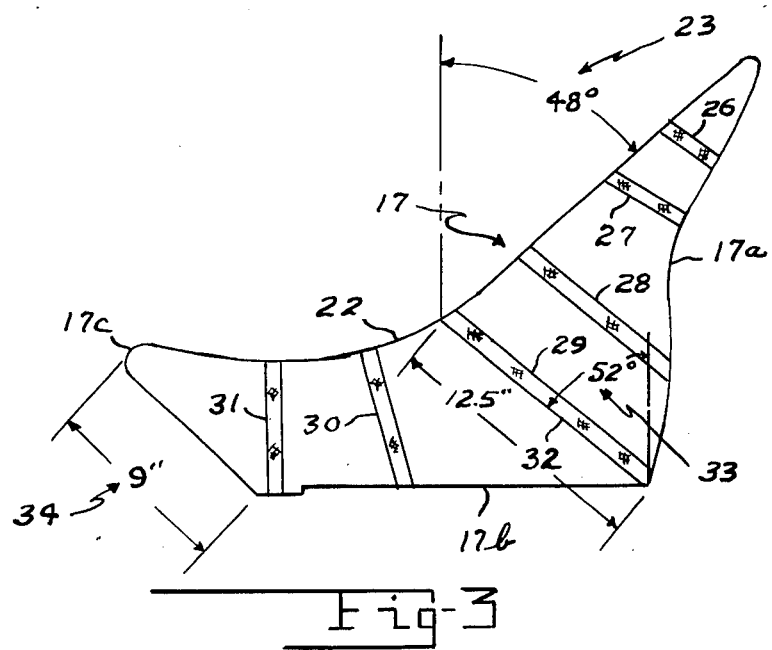

The aforementioned stowed, deflated and inflated conditions or positions of the novel air bladder cushion 17 are, again, illustrated more clearly and respectively in FIGS. 2 and 3. In this connection, it is noted that the aircraft ejection seats of most conventional fighter aircraft of the United States are tilted backward at an angle of between 13° and 20° to the vertical. However, the seat of the F-16 fighter aircraft is actually tilted backward at an angle of 30° to the vertical, as in the case for the seat depicted in FIG. 1 and which 30° degree angle is indicated at the reference numeral 20. In the aforementioned FIG. 2, this fixed backward tilting angle of the back of the ejection seat is depicted schematically at 21 as being, in this instance, at a backward tilt angle of 17°. Thus, the said air bladder cushion 17 and, of course, the pilot or other aircrew member, as at 19 (FIG. 1), would be naturally already disposed at the aforementioned 17° or 30° backward angle, depending on which seat was being utilized, when the said inventive air bladder cushion 17 was in its deflated condition of FIG. 2, for example. When, however, the 17° built-in seat angle of FIG. 2 was used, for instance, then to achieve a total backward tilting angle of 65°, the air bladder cushion 17 of the present invention, when inflated as shown in the aforementioned FIG. 3, would require an additional 48° backward tilting angle to be applied to the upper surface 22 thereof. In other words, for normal flight conditions in a conventional fighter aircraft using an ejection seat naturally disposed at the angle specified for the seat to be used with the configuration of FIG. 2, for example, the seat back angle thereof would remain constant at the previously noted approximately 17° from the vertical. By increasing the said seat back angle to 65°, as noted hereinbefore, the human tolerance level for sustained g loads can be increased significantly. For the latter purpose, and as is uniquely taught by the present invention, the novel air bladder cushion 17 would be inflated to the position or condition or FIG. 3 (also shown in broken lines in FIG. 1) to give an additional angle to the vertical of 48°, as is indicated at the reference numeral 23, which, when added to the 17° angle at which the ejection seat is already fixedly tilted in the backward direction, would give the requisite total of 65°. Of course, the supine or 90° position would give the maximum protection against high g loads; however, the said supine position would, it is self-evident, be impractical for flying the aircraft with proper safety. The 65° backward tilt, which would be obtained in the present invention by the inflation of the inventive air bladder cushion 17, gives considerable protection to the pilot and other aircrew members against high g loads while, at the same time, affording reasonably good and quite essential forward visibility, as well as providing for and ensuring satisfactory mobility to the occupant of the seat. Of course, with the 30° backward tilted seat of the type disclosed in FIG. 1, the specific design of the inventive air cushion bladder 17 may be rather easily modified to give an angle between the vertical and the upper surface of the air bladder cushion 17 of only an additional 35°.

Again referring to FIG. 2, it is seen that the air bladder cushion 17 may incorporate a substantially upright, back portion 17a that, with a selected conventional ejection seat at the previously-noted backward angle of 17°, would be approximately 21 inches in length, as indicated at 24, and an intergal seat portion 17b fitted of course over the seat pan portion of the aircraft ejection seat and terminating in an upwardly curved section 17c conforming with the natural configuration of the conventional ejection seat pan and being approximately 19 inches in length as indicated at 25. Now, specifically referring to FIG. 3, the air bladder cushion 17, which may be fabricated of any appropriated vulcanized and/or inflatable material, is shown in its inflated condition to thereby give the previously noted approximately 48° angle between the vertical and the upper surface 22 thereof which, when added to the 17° angle inherently built into the aircraft ejection seat, will give the 65° angle selected for optimization between the reasonable resistance to high g loads and good forward visibility. To insure that the upper surface 22 of the air cushion bladder 17 is disposed at the selected angle with the vertical, when inflated, a plurality of spaced-apart, restrictor bands may be periodically installed between the upper and lower surfaces and on both sides of the air bladder cushion 17. The respective lengths of the said restrictor bands, as is depicted schematically at 26, 27, 28, 29, 30 and 31, for example, would be precomputed and selected so as to ensure that, with the full inflation of the air cushion bladder 17, the expansion of various critical sections of the latter member would be specifically and expressly controlled to enable the relatively comfortable positioning of the pilot or other aircrew member with his back disposed at the preselected backward angle to be used during high speed maneuvering. In this connection, with the design of the air bladder cushion 17 of the invention illustrated in the aforementioned FIG. 3, an imaginary line 32 of approximately 12.5 inches and indicating the section of the widest expansion of the inflated air bladder cushion 17 would be disposed at an approximate angle of 52°, as indicated at 33, with the vertical, and the end of the seat portion 17b thereof would extend to a distance of approximately 9 inches, as denoted at 34. To complete the dimensions of the inventive air bladder cushion 17, it would have a width of approximately 17 inches in its use with conventional fighter aircraft.

Of course, with the back and seat portions 17a and 17b of the inventive air cushion bladder 17 being simultaneously expanded in the upward and outward direction with the inflation of the said bladder 17, which action is clearly evident from the illustration of FIG. 1, there would be positive assurance that the pilot or other aircrew member, as at 19 (FIG. 1), in addition to being thereby disposed with his back at the specified 65° angle, would be relocated both upwardly and forwardly to thereby ensure the retention of the head in the proper position consistent with good forward visibility.

Thus, a new and improved means of protecting pilots and other aircrew members from high g forces has been developed by the present invention whereby a novel air bladder cushion-insert is applied to the aircraft ejection seat and inflated, during periods of high g maneuvering, to thereby increase the effective seat back angle to approximately 65° and thus substantially increase human tolerance to sustained g forces. The inflation of the inventive air bladder cushion, which could be easily effected by the introduction therewithin of a supply of compressed air by any well-known means, has the effect of forming a rather comfortable couch or cushion. During periods of normal flight conditions, the inventive bladder would be deflated and, in this mode, become part of the seat padding.

With the use of the present air bladder cushion, a standard ejection seat can be used, the need for an ejection seat using mechanically moving parts for the adjustment thereof to both normal and high g positions can be eliminated, and, finally, an entirely new high acceleration cockpit (HAC) ejection seat, involving millions of dollars in an extensive design, development and qualification program would not be required.

I claim:

1. In an aircraft ejection seat having a seat pan portion and a seat back portion rigidly mounted thereto at a predetermined minimum backward tilt angle; a pneumatically-operable, inflatable, air bladder cushion pad element disposed in supporting relation with the said seat pan and seat back portions, and adjustable between a first, deflated position against and acting as a part of the padding of the ejection seat and a second, inflated position with an upper surface portion thereof being disposed upwardly against and effectively forming a new back supporting surface for, and automatically tilting the occupant of the seat at a substantially increased and predetermined maximum angle of backward tilt towards the supine position for a significantly increased tolerance to sustained acceleration levels of up to 10 to 12 $g$'s; said air bladder cushion pad element including a first, back supporting portion attached to, and conforming with the configuration of, the seat back portion; and a second, seat portion integrally formed with said first, back supporting portion, and attached to and conforming with the seat pan portion of the ejection seat.

2. In an aircraft ejection seat as in claim 1, wherein said air bladder cushion pad element further includes a first, inner surface affixed to, and substantially conforming with the surface of the seat back and seat pan portions; and a second, outer surface integrally formed with, and expandable outwardly from the said first, inner surface, when said air bladder cushion pad element is adjusted to its inflated position, to thereby form the said new back supporting surface and providing an adjusted seat position at the said predetermined maximum angle of backward tilt of both greatly increased comfort to the occupant of the seat and significant protection against relatively high $g$ loads occurring particularly during high speed maneuvering.

3. In an aircraft ejection seat as in claim 2, and a plurality of restrictor elements of precomputed and varying lengths mounted in periodically spaced-apart relation on both sides of said air bladder cushion pad element and between the inner and outer surfaces thereof to thereby ensure that the expansion of said outer surface, during the inflation of said air bladder cushion pad element, is expressly controlled to specifically achieve the desired and preselected angle at which the occupant of the seat is tilted backwards to obtain the requisite protection against prolonged exposure to high $g$ loads.

* * * * *